United States Patent
Lauk et al.

(10) Patent No.: US 6,288,466 B1
(45) Date of Patent: Sep. 11, 2001

(54) ELECTRIC DRIVE UNIT

(75) Inventors: Detlef Lauk, Renchen; Ernst Fischer, Gernsbach; Hansjoerg Karcher, Buehlertal; Juergen Herp, Buehl; Erik Maurer, Buehlertal; Andreas Wiegert, Kappelrodeck; Richard Hurst, Offenburg; Anton Waibel, Hagnau, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/530,418
(22) PCT Filed: Aug. 27, 1999
(86) PCT No.: PCT/DE99/02687
  § 371 Date: Aug. 25, 2000
  § 102(e) Date: Aug. 25, 2000
(87) PCT Pub. No.: WO00/13295
  PCT Pub. Date: Mar. 9, 2000

(30) Foreign Application Priority Data

Aug. 29, 1998 (DE) .............................. 198 39 407

(51) Int. Cl.$^7$ ................ H02K 5/11; H02K 7/10
(52) U.S. Cl. ................ 310/91; 310/90; 310/42
(58) Field of Search ............... 310/90, 83, 42, 310/91; 74/425; 384/584, 586, 537, 542, 585

(56) References Cited

U.S. PATENT DOCUMENTS

| | | | |
|---|---|---|---|
| 5,087,847 | * | 2/1992 | Giesbert et al. ............ 310/90 |
| 5,624,193 | * | 4/1997 | Vogelsberger et al. ...... 384/517 |
| 5,788,210 | * | 8/1998 | Mimura ...................... 248/672 |
| 6,045,268 | * | 4/2000 | Long et al. ................. 384/542 |

* cited by examiner

Primary Examiner—Tran Nguyen
(74) Attorney, Agent, or Firm—Ronald E. Greigg; Edwin E. Greigg

(57) ABSTRACT

An electric drive unit having an electric drive motor and a transmission. The electric drive motor has an armature shaft which extends, for example, to a worm shaft of the transmission. The shaft is embodied of one piece with the armature shaft. A first bearing and a second bearing are provided to support the armature shaft. The second bearing is embodied as a ball bearing with an outer ring, an inner ring, and balls. The inner ring is press-fitted in a rotationally fixed manner onto the armature shaft. The outer ring is slid into a receiving bore disposed in the transmission housing and is pressed against an axial stop face adjoining the receiving bore by means of a retaining part that is supported in an installation channel and has flexible tongues that are directed toward the outer ring. This axial pressing can be produced in an easy-to-assemble fashion and is also inexpensive thanks to a low cost of the retaining part. The proposed electrical drive unit can be used, for example, for at least one windshield wiper of a vehicle.

8 Claims, 3 Drawing Sheets

ELECTRIC DRIVE UNIT

PRIOR ART

The invention is based on an electric drive unit.

A subsequently published patent DE 197 27 120 A1, sets forth an electric drive unit, for a windshield wiper of a vehicle. The electric drive unit includes drive motor with an armature that is accommodated in an essentially cup-shaped pole housing, with an essentially cup-shaped transmission housing. The transmission housing is fastened to the end face of the pole housing and is for containing transmission elements that are acted on by the rotation of an armature shaft of the armature. The armature shaft is supported in the pole housing at one end and in the transmission housing at the other end, wherein the armature shaft is supported in a first bearing adjacent to a bottom of the pole housing and is supported in a second bearing in the vicinity of the transmission housing. The second bearing is embodied as a ball bearing, which absorbs radial and axial forces and is axially secured on one side by an axial stop face in the transmission housing and is axially secured on the other side by a retaining bracket that is inserted into the transmission housing lateral to the armature shaft and in this connection, is embodied as U-shaped.

ADVANTAGES OF THE INVENTION

The drive unit has an advantage that the flexible tongues load the outer ring of the ball bearing toward the transmission housing, in a direction of an axial stop face and in this manner, permit the outer ring of the ball bearing to press against the axial stop face in a play-free manner.

Advantageous updates and improvements of the electric drive unit are possible by measures taken as set for the hereinafter.

The drive unit has the advantage that a tool designated for producing the retaining bracket is relatively easy to embody.

The retaining bracket can be installed without any trouble by means of a simply embodied auxiliary device.

The features set for therein result in the advantage that additional flexible tongues load the outer ring of the ball bearing in the direction of the axial stop face.

An exemplary embodiment of the electric drive unit is shown in the drawings and will be described in detail below.

DESCRIPTION OF THE EXEMPLARY EMBODIMENT

Figure 1:
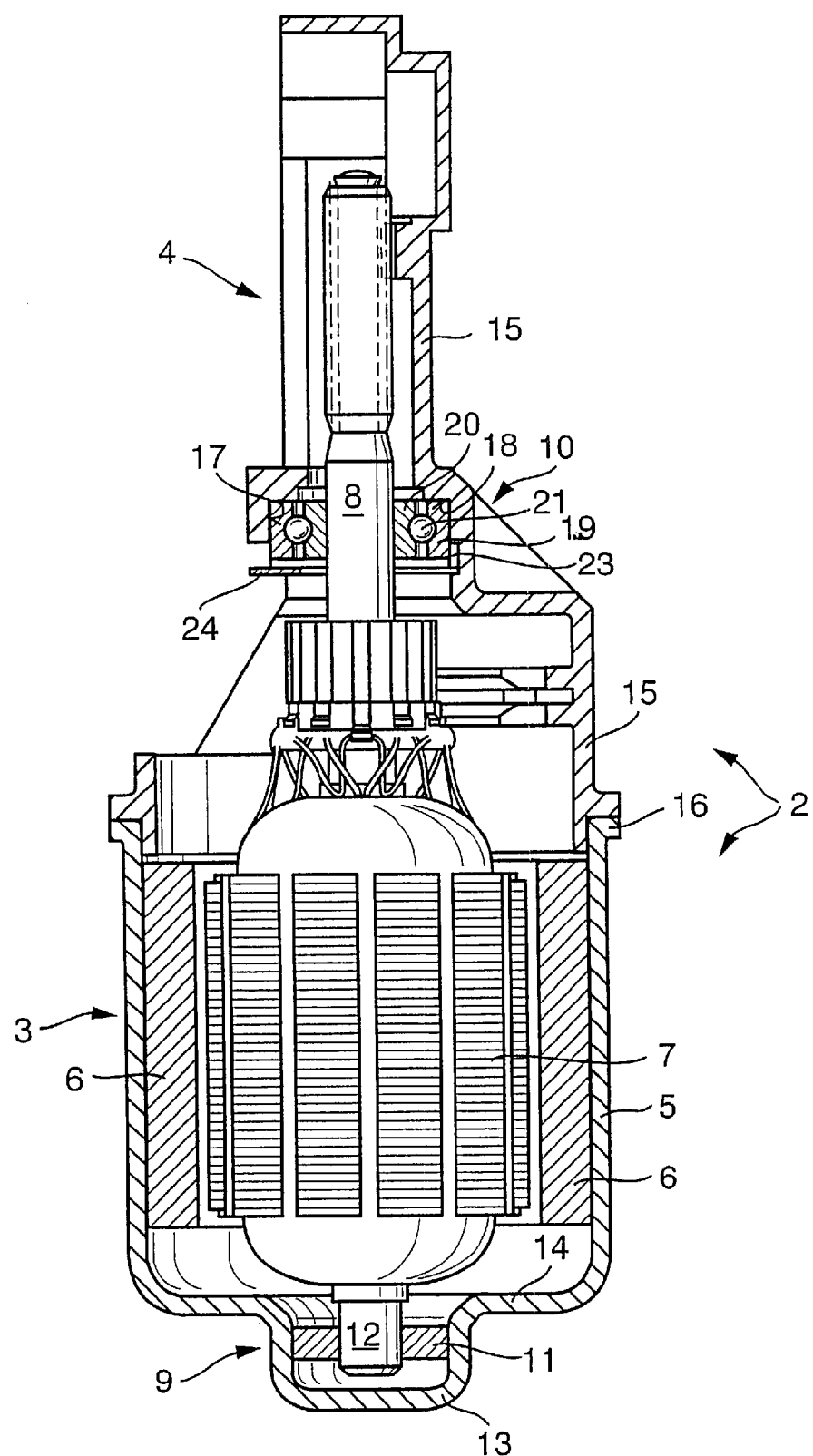
FIG. 1 is a longitudinal section through the electric drive unit according to the invention.
Figure 2:
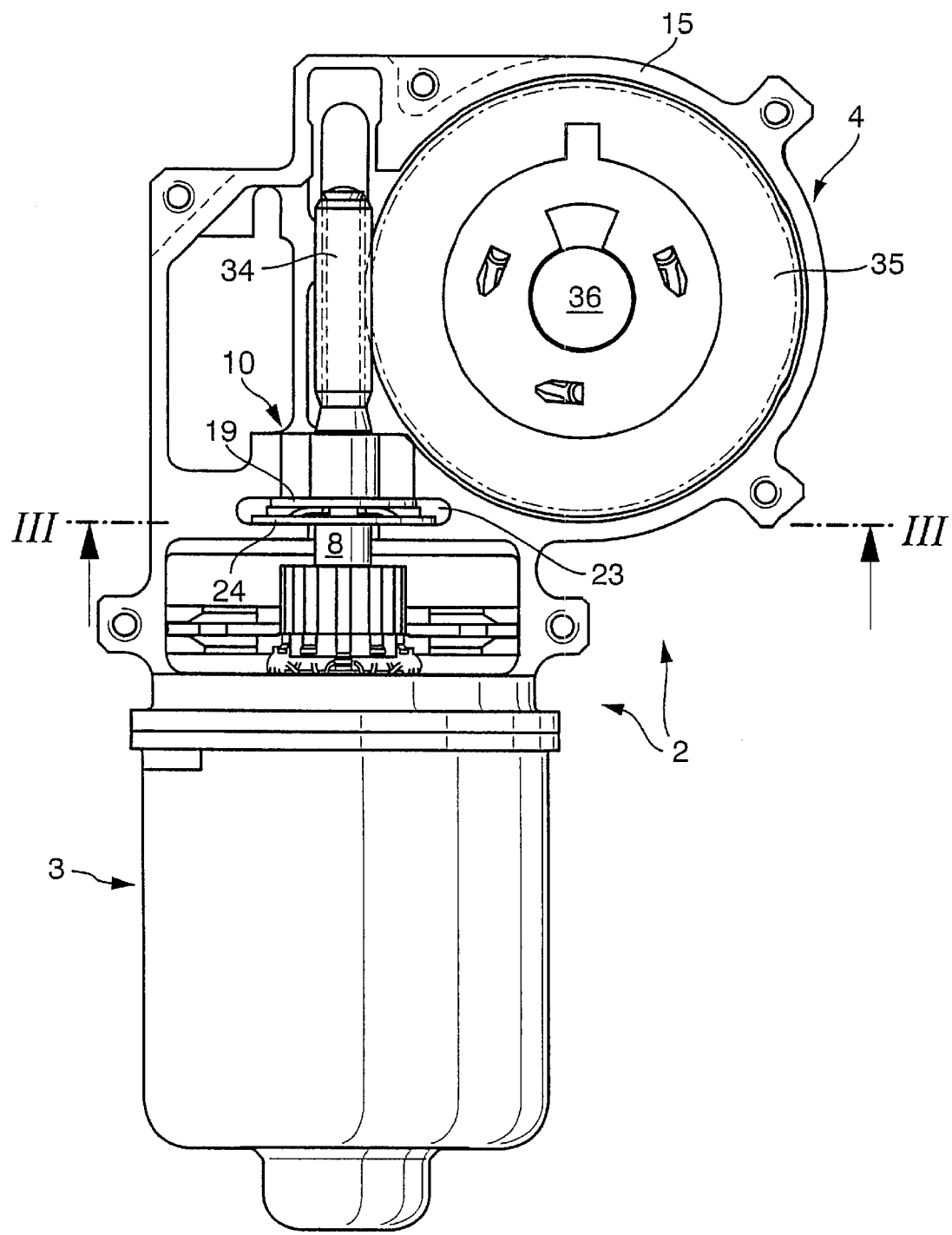
FIG. 2 is a top view of the electric drive unit according to FIG. 1.

The electric drive unit 2 according to FIGS. 1 and 2 shows an electric drive motor 3 and a transmission 4.

As FIG. 1 shows, the electric drive motor 3 has a pole housing 5 with built-in permanent magnets 6, an armature 7, an armature shaft 8, as well as a first bearing 9 and a second bearing 10 for supporting the armature shaft 8.

The first bearing 9 is embodied as a radial bearing in the form of a slide bearing and to this end, has a bearing bush 11. A shaft end 12 of the armature shaft 8 is rotated in the bearing bush 11. The bearing bush 11 is disposed in a cup-like indentation 13 of a bottom 14 of the pole housing 5.

Figure 4:
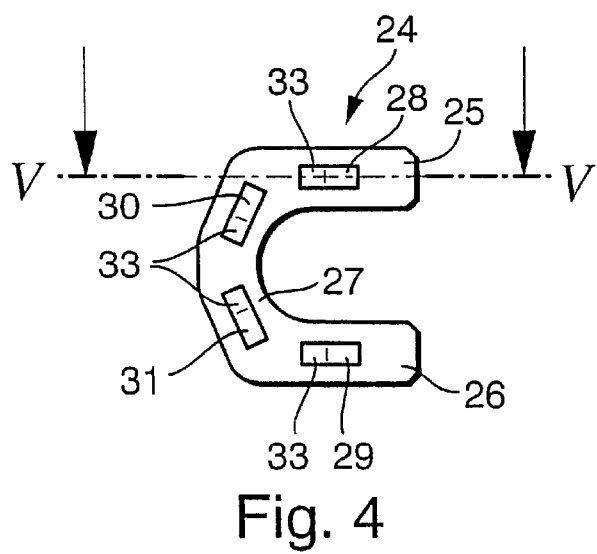
Figure 6:
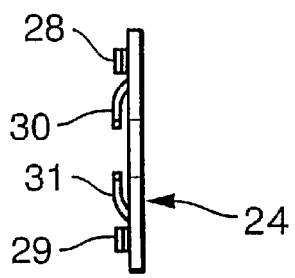
Figure 5:
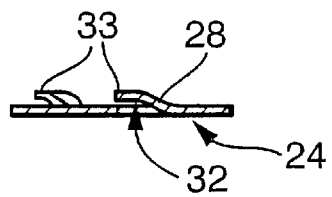

The transmission 4 has a transmission housing 15, which is attached to a flange-like limiting edge 16 of the pole housing 5. The transmission housing 15 has an axial stop face 18 and a receiving bore 17 for containing the second bearing 10. The receiving bore 17 opens in the direction toward the pole housing 5. The second bearing 10 is embodied as a ball bearing with an outer ring 19, an inner ring 20, and balls 21. The inner ring 20 is snugly press-fitted onto the armature shaft 8. The outer ring 19 is slid into the receiving bore 17. As can be seen best in FIG. 2, the top view, in the vicinity of an end face 22 of the outer ring 19 directed toward the pole housing 5, the transmission housing 15 has a channel 23 that cuts across the receiving bore 17 and the armature shaft 8. This channel 23 can also be seen in FIG. 3 and is partially visible in FIG. 1. The channel 23 is used to contain a retaining part 24, which is shown as a separately drawn component in FIGS. 4 to 6. The retaining part 24 is comprised, for example, of spring steel, is essentially U-shaped with two legs 25 and 26 and a yoke 27, and, in the example according to FIGS. 4 to 6, has four flexible tongues 28, 29, 30, 31. These flexible tongues 28 to 31 can be manufactured by producing U-shaped incisions in the legs 25 and 26 and in the yoke 27. As can be seen in FIG. 5, which shows the retaining part 24 in a partially sectional view, the tongue 28 extends at an angle out from a plane of the retaining part 24 in FIG. 5 and then, after a bend 32, ends in the form of a free flexible end 33. The flexible tongues 29, 30, and 31 are also bent out from the reference plane of the retaining part 24 and likewise have bends, which are not numbered, and free ends 33. As can be seen, the free ends 33 of the flexible tongues 28 and 29 point toward where the yoke 27 adjoins the legs 25 and 26 of the retaining part 24. The flexible tongues 30 and 31 are aligned at angles to each other in such a way that the free flexible ends 33 are directed toward each other. Thereby the longitudinal directions of the flexible tongues 30 and 31 enclose an angle of essentially 135°. In this respect, the free flexible ends 33 of the flexible tongues 30 and 31 are angularly offset from the longitudinal axis of the armature shaft 8 by essentially 45°. For example, the flexible tongues 28 and 29 a realigned so that the free flexible ends 33 are disposed diametrically opposite from each other in relation to the longitudinal axis of the armature shaft 8.

Figure 3:
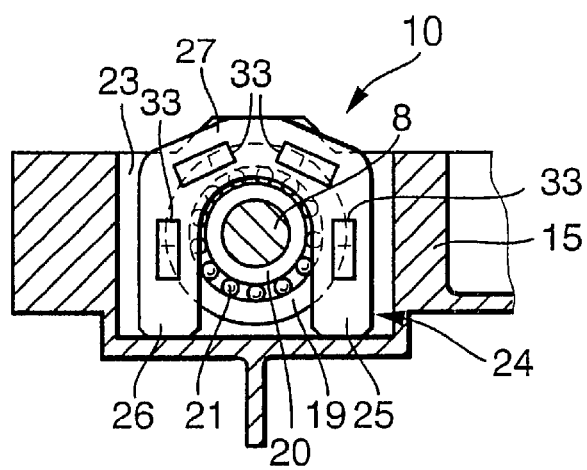
FIG. 3 is a cross-section through the electric drive unit of FIG. 1, and FIGS. 4 to 6 show different views of a component of the electric drive unit according to the invention from FIG. 1.

As can be seen best in FIG. 3, in order to insert the retaining part 24, it is placed with its legs 26 and 25 first in the transmission housing 15 and is slid into the channel 23, as a result of which the legs 25 and 26 go into position and the yoke 27 is disposed above the armature shaft 8. When the retaining part 24 is installed, the free flexible ends 33 of the flexible tongues disposed in the legs 25 and 26 point counter to the installation direction. This has the advantage that it is possible to insert the retaining part 24 with no trouble into the channel 23, along the end face 22 of the outer ring 19 of the second bearing 10, wherein the flexible tongues are bent elastically toward the reference plane of the retaining part 24 and as a result, exert forces on the outer ring 19 of the second bearing 10 which cause the outer ring 19 to come into contact with the axial stop face 18. The free ends 33 of the flexible tongues 30 and 31 finally come into coincidence with the outer ring 19 and as a result, reinforce the pressure of the outer ring 19 against the axial stop face 18. As can be seen in FIG. 3, what is essential is that the free ends 33 are directed against the end face 22 of the outer ring 19.

As described above, the inner ring 20 is press-fitted snugly onto the armature shaft so that no relative motion occurs between the armature shaft 8 and the inner ring 20. As explained above, due to the presence of the axial stop face 18 in the transmission housing 15 and because the retaining part 24 is supported in the channel 23 and the flexible tongues 28 to 31 coming from the retaining part 24 press against the end face 22 of the outer ring 19, the second bearing 10 is both a radial bearing and an axial bearing.

Starting from a longitudinal section of the armature shaft 8 that is contained in the inner ring 20, this armature shaft 8 is elongated by a worm shaft 34 that extends into the transmission housing 15. This worm shaft 34 is engaged by a worm gear 35, which is secured in a rotationally fixed manner to a drive shaft 36 and is supported so that it can rotate with the aid of this drive shaft 35. The drive shaft 36 is connected, for example, to a crank mechanism, not shown, of a windshield wiper. This crank mechanism that is not shown sets at least one wiper arm into periodic pivoting movements in a known fashion. Due to the mass of the wiper arm and a wiper fastened to it and due to the kinematics of the crank mechanism, it is clear that the drive shaft 36 both imparts torques to the crank mechanism and receives drag moments from it. Correspondingly, even when the worm gear 35 engages the worm shaft 34, forces occur that have changing axial directions in relation to the longitudinal axis of the worm shaft 34. These normally occurring forces travel to the outer ring 19 of the second bearing 10 and are absorbed on the one hand by the axial stop face 18 and on the other hand by the resilient tongues 28 to 31. The outer ring 19 remains in contact with the axial stop face 18 during normal operation because the flexible tongues have been made to be sufficiently strong by the manufacturer. This results in the advantage that axial displacements of the armature shaft 8 or the worm shaft 34 are limited to the magnitude predetermined by the inevitably necessary movement play of the balls 21 between the outer ring 19 and the inner ring 20.

The above-described second bearing 10 in contact with the axial stop face 18 and also in contact with the flexible tongues 28 of the retaining part 24 can also be used, for example, if the armature shaft drives an obliquely geared spur pinion of a spur gear. This is because here, too, torque direction changes would lead to changing axial forces along the armature shaft 8.

The disposition of the channel 23 in the transmission housing 15 and the embodiment according to the invention of the retaining part 24 make it possible to embody the combined armature shaft 8 and worm shaft 34, together with the second bearing 10, so that they are easy to insert into the transmission housing 15, whereupon in an easy-to-execute installation step, the retaining part 24 can be inserted into the channel 23 and assures a play-free axial securing of the outer ring 19 of the second bearing 10.

The foregoing relates to a preferred exemplary embodiments of the invention, it being understood that other variants and embodiments thereof are possible within the spirit and scope of the invention the latter being defined in the appended claims.

What is claimed is:

1. An electric drive unit for a windshield wiper of a motor vehicle, comprising a drive motor with an armature that is accommodated in a pole housing, a transmission housing that is fastened to the pole housing and is for containing transmission elements in which the transmission elements are acted on by a rotation of an armature shaft of the armature, the armature shaft is supported in the pole housing at a first end and in the transmission housing at a second end, the armature shaft is supported in a first bearing in the pole housing and is supported in a second bearing in a vicinity of the transmission housing, the second bearing is embodied as a ball bearing, the second bearing absorbs radial and axial forces and has an inner ring (20) and outer ring (19), on one side of said outer ring an axial stop face (18) is disposed in the transmission housing for the outer ring, and on another side of the outer ring a retaining part (24) for axially securing the outer ring is installed lateral to the armature shaft in a channel (23) of the transmission housing, the retaining part is an essentially U-shaped retaining bracket (24) made of sheet metal and has at least two flexible tongues (28, 29, 30, 31) that are directed toward an end face (22) of the outer ring (19) of the second bearing (10).

2. The electric drive unit according to claim 1, in which said at least two flexible tongues (28, 29) are distributed on the two legs (25, 26) of the U-shaped retaining part (24) and that free flexible ends (33) of the at least two flexible tongues (28, 29) are essentially disposed opposite form each other on the legs of the U-shaped member.

3. The electric drive unit according to claim 1, in which four flexible tongues (28, 29, 30, 31) are provided, wherein two of the flexible tongues (30, 31) are disposed in a yoke (27) of the retaining part (24) in mirror image fashion, with the free flexible ends (33) of two of the flexible tongues pointing toward each other, and the flexible tongues (30, 31) enclose an angle between themselves.

4. The electric drive unit according to claim 2, in which four flexible tongues (28, 29, 30, 31) are provided, wherein two of the flexible tongues (30, 31) are disposed in a yoke (27) of the retaining part (24) in mirror image fashion, with the free flexible ends (33) of two of the flexible tongues pointing toward each other, and the flexible tongues (30, 31) enclose an angle between themselves.

5. An electric drive unit for a windshield wiper of a motor vehicle, comprising a drive motor with an armature that is accommodated in a pole housing, a transmission housing that is fastened to the pole housing and is for containing transmission elements in which the transmission elements are acted on by a rotation of an armature shaft of the armature, the armature shaft is supported in the pole housing at a first end and in the transmission housing at a second end, the armature shaft is supported in a first bearing in the pole housing and is supported in a second bearing in a vicinity of the transmission housing, the second bearing is embodied as a ball bearing, the second bearing absorbs radial and axial forces and has an inner ring (20) and outer ring (19), on one side of said outer ring an axial stop face (18) is disposed in the transmission housing for the outer ring, and on another side of the outer ring a retaining part (24) for axially securing the outer ring is installed lateral to the armature shaft in a channel (23) of the transmission housing, the retaining part is an essentially U-shaped retaining bracket (24) made of sheet metal and has at least two flexible tongues (28, 29, 30, 31) that are directed toward an end face (22) of the outer ring (19) of the second bearing (10), wherein said at least two flexible tongues (28, 29) are respectively located on the two legs of the U-shaped retaining bracket (24) and aligned parallel to an installation direction of the U-shaped retaining bracket.

6. The electric drive unit according to claim 5, in which four flexible tongues (28, 29, 30, 31) are provided, wherein two of the flexible tongues (30, 31) are disposed in a yoke (27) of the retaining part (24) in mirror image fashion, with the free flexible ends (33) of two of the flexible tongues pointing toward each other, and the flexible tongues (30, 31) enclose an angle between themselves.

7. The electric drive unit according to claim 5, in which free flexible ends (33) of the at least two flexible tongues (28, 29) are essentially disposed diametrically opposite form each other in relation to an axis of the armature shaft (8).

8. The electric drive unit according to claim 5, in which four flexible tongues (28, 29, 30, 31) are provided, wherein an additional two of the flexible tongues (30, 31) are disposed on a yoke (27) of the retaining part (24) in mirror image fashion, with the free flexible ends (33) of the additional two of the flexible tongues pointing toward each other, and the two additional flexible tongues (30, 31) enclose an angle between themselves.

* * * * *